United States Patent [19]

Iwasawa et al.

[11] 4,326,217
[45] Apr. 20, 1982

[54] REVERSED IMAGE SENSING APPARATUS

[75] Inventors: Teruo Iwasawa, Mitaka; Masafumi Yamazaki, Okaya; Kosaku Tsuboshima, Hachioji; Shuichi Takayama, Hachioji; Yoshio Nakajima, Hachioji, all of Japan

[73] Assignee: Olympus Optical Co. Limited, Japan

[21] Appl. No.: 87,233

[22] Filed: Oct. 22, 1979

[30] Foreign Application Priority Data

Nov. 2, 1978 [JP] Japan .................................. 53-134427

[51] Int. Cl.³ .......................... G03F 3/10; H04N 1/40;
H04N 1/028; H04N 3/36
[52] U.S. Cl. ..................................... 358/76; 358/280;
358/294; 358/214
[58] Field of Search .................. 358/6, 21, 22, 42, 54,
358/76, 130, 214, 75, 77–80, 213–215, 280, 282,
285, 293, 294

[56] References Cited

U.S. PATENT DOCUMENTS

| 2,642,487 | 6/1953 | Schroeder | 358/55 |
| 3,693,042 | 9/1972 | Fredkin et al. | 358/214 |
| 4,009,489 | 2/1977 | Seer | 358/54 |
| 4,117,510 | 9/1978 | Ohta et al. | 358/44 |
| 4,242,703 | 12/1980 | Tsuboshima et al. | 358/42 |

*Primary Examiner*—John C. Martin
*Attorney, Agent, or Firm*—Stevens, Davis, Miller & Mosher

[57] ABSTRACT

A reversed image sensing apparatus comprising an image sensor composed of a charge transfer element including photosensitive elements arranged in a picture element unit, an optical system including a focusing lens and a light source and focusing an image recorded on a recording medium onto said image sensor, a voltage inverting circuit operative to receive the output video signal from said image sensor and produce a reversed video signal, a photosensitive element operative to detect the brightness of said light source, and a compensating circuit operative to automatically correct said reversed video signal on the basis of the brightness signal delivered from said photosensitive element in response to charge in said light source.

6 Claims, 5 Drawing Figures

REVERSED IMAGE SENSING APPARATUS

BACKGROUND OF THE INVENTION

This invention relates to a reversed image sensing apparatus which can observe an image formed on a negative film by means of a still camera or the like as a positive image.

In the still camera or the like, heretofore, it has been the common practice to take photograph of an object with the aid of a negative film or a reverse film. In order to observe the image photograph taken of the object, the negative film is developed and then printed onto a photographic paper, while the reverse film is developed into a slide film.

In the case of the negative film, the cost of printing is far higher than the cost of development. In addition, the photographic paper tends to be easily discolored and hence could not be preserved for a long time. As a result, an old photograph must be newly printed. The negative film, therefore, is significantly troublesome and uneconomical.

In the case of the reverse film, the reverse film itself and the cost of development thereof are expensive. In addition, the film could not be printed onto the photographic paper. The reverse film, therefore, is also uneconomical and not versatile.

SUMMARY OF THE INVENTION

An object of the invention, therefore, is to provide a reversed image sensing apparatus which can observe an image formed on a negative film by means of a still camera or the like as a positive image without printing it onto a photographic paper.

A feature of the present invention is to provide a reversed image sensing apparatus comprising a light source having an optical system for illuminating a recording medium, an image sensor for forming thereon an image recorded on the recording medium so as to obtain a video signal, a video signal generating circuit for producing a negative video signal by receiving an output signal from said image sensor, a video amplifier for amplifying said negative video signal up to an appropriate level, a voltage inverting circuit for producing a reversed video signal from the video singal from said image sensor, a television signal processing circuit for converting said reversed video signal into a color television signal by receiving an output from said voltage inverting circuit and a synchronizing signal from a synchronizing signal generator so as to display said color television signal on a color television monitor, said sensor being driven by a clock signal generated in synchronism with a synchronizing signal, and a compensating circuit having a sensitivity compensating filter, photosensitive element and amplifier and compensating a level change of the output of said voltage inverting circuit by detecting an intensity change of the light source, whereby the level change of said reversed video signal is automatically compensated for a variation of intensity of the light source by means of an intensity signal detected by said sensitivity compensating filter and photosensitive element.

Another feature of the present invention is to provide a reversed image sensing apparatus comprising a light source having an optical system for illuminating a recording medium, three image sensors for forming three color images recorded on the recording medium so as to obtain a color video signal, a video signal generating circuit for producing a negative video signal by receiving an output signal from said image sensor, a video amplifier for amplifying said negative video signal up to an appropriate level, a voltage inverting circuit for producing a reversed video signal from the video signal delivered from said image sensor, a television signal processing circuit for converting said reversed video signal into a color television signal by receiving an otuput from said voltage inverting circuit and a synchronizing signal from a synchronizing signal generator so as to display said television signal on a color television monitor, said sensor being driven by a clock signal generated in synchronism with a synchronizing signal, a compensating circuit having a sensitivity compensating filter, a photosensitive element, an amplifier for compensating a level change of the output of said voltage inverting circuit by detecting an intensity change of the light source, a stripe filter of three primary colors disposed in front of said image sensor, an electric motor connected to said stripe filter so as to drive it, and a motor control circuit connected to said synchronizing signal generator and controlling said motor in synchronism with said synchronizing signal generator, whereby the level change of said reversed video signal is automatically compensated for a variation of intensity of the light source by means of an intensity signal detected by said sensitivity compensating filter and photosensitive element.

Further objects and features of the invention will be fully understood from the following detailed description with reference to the accompanying drawings.

DETAILED DESCRIPTION OF THE PREFERRED EMBODIMENTS

Figure 1:
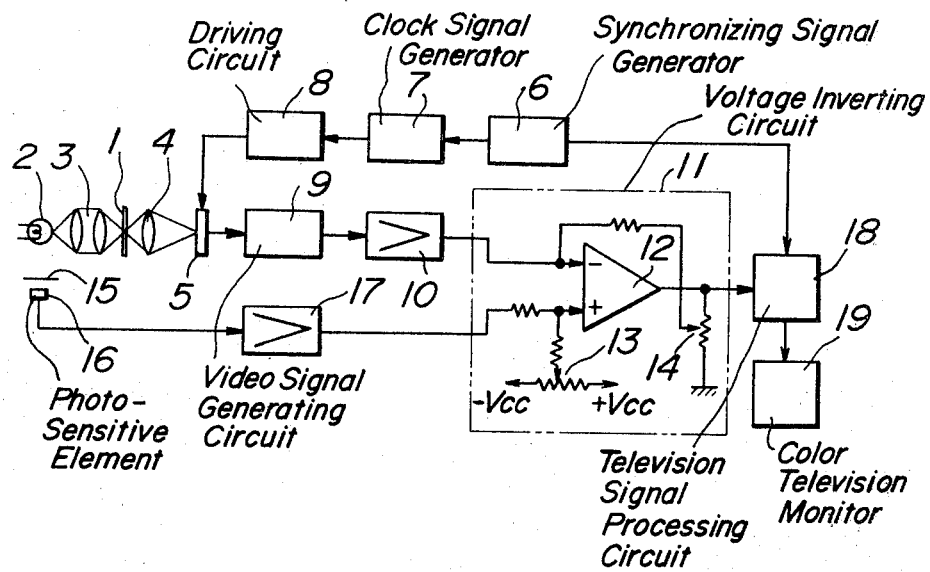
FIG. 1 is a schematic diagram of an embodiment of a reversed image sensing apparatus according to the invention.
Figure 2A:
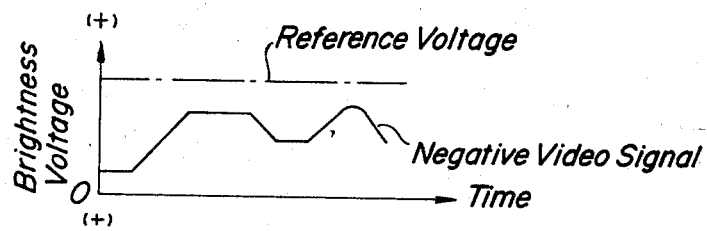
FIGS. 2a and 2b are graphs showing a negative video signal and a positive video signal produced in the apparatus shown in FIG. 1, respectively.
Figure 2B:
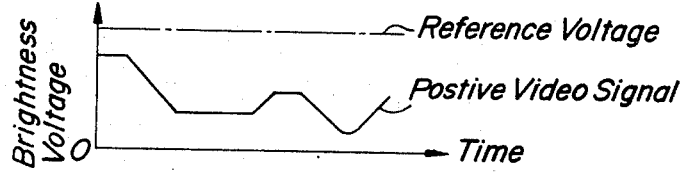

FIG. 1 diagramatically shows an embodiment of a reversed image sensing apparatus according to the invention. In the present embodiment, a video signal of a positive image is obtained from a negative image recorded on a developed color or monochromatic negative film. The video signal thus obtained is converted into a television signal of NTSC color television system so as to display it on a conventional color television monitor as a positive monochromatic image. A developed negative film 1 is illuminated by a white light emitted from a white light source 2 and passed through an optical system 3. A light flux transmitted through the film 1 passes through a focusing lens 4 and is focused onto an image sensor 5. As a result, a negative image recorded on the negative film 1 is formed on the image sensor 5. The image sensor 5 is composed of a charge transfer device formed of a charge coupled device (CCD) or a bucket brigate device (BBD) and including a number of photosensitive elements arranged per picture element in a two-dimensional array. Synchronizing signals delivered from a synchronizing signal generator 6 are supplied to a clock signal generator 7 which supplies clock signals to a driving circuit 8 which functions to control and drive the image sensor 5. An output signal from the image sensor 5 is supplied to a video signal generating circuit 9 to produce a negative video signal. Circuit 9 converts the discrete pulse-like signals produced by image sensor 5 into a continuous video signal. The negative video signal thus produced is amplified by a video signal amplifier 10 up to an appropriate level and then supplied to a negative input terminal of a differential amplifier 12 in a voltage inverting circuit 11. A positive input terminal of the differential amplifier 12 is connected to a first potentiometer 13 and receives therefrom a predetermined reference voltage. As a result, the negative video signal is inverted with respect to the reference voltage and delivered from the differential amplifier 12 as a positive video signal. Thus, if the first potentiometer 13 is adjusted so as to charge the reference voltage, it is possible to adjust brightness or darkness of the positive video signal. FIG. 2a shows a negative video signal and FIG. 2b shows a positive video signal. The positive video signal is fed back through a second potentiometer 14 to the negative input terminal of the differential amplifier 12. As a result, it is possible to change the gain of the positive video signal and hence adjust the contrast thereof.

Meanwhile, a white light from the white light source 2 incidents through a sensitivity compensating, neutral density filter 15 on a second photosensitive element 16 formed of cadmium sulfide or the like and is detected. That is filter 5 is selected so that the intensity of the light striking photosensitive element 16 falls within the limits of the dynamic range of the control path. The output signal thus detected is supplied through an amplifier 17 to the positive input terminal of the differential amplifier 12. As a result, a signal representing an intensity of the white light source 2 is fed back to the reference voltage and hence it is possible to obtain a positive video signal which is compensated for a variation in intensity of the white light source 2.

In the present embodiment, the positive video signal delivered from the voltage inverting circuit 11 is supplied to a television signal processing circuit 18 which functions to convert the positive video signal into an NTSC color television signal on the basis of the synchronizing signal delivered from the synchronizing signal generator 6. The television signal thus obtained is displayed as a monochromatic image on a conventional color television monitor 19.

Figure 3:
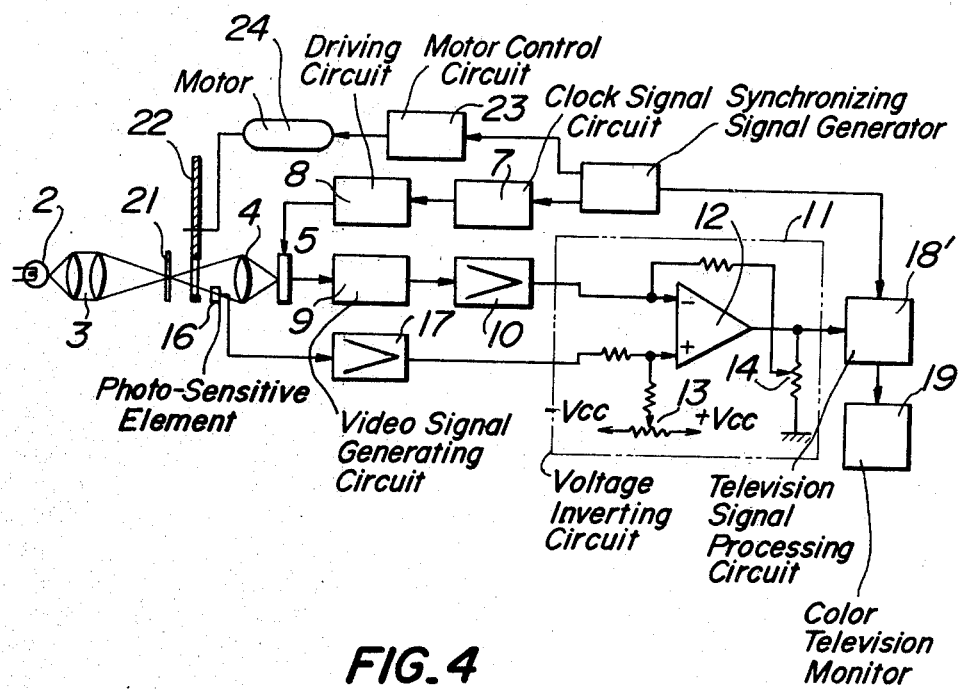
FIG. 3 is a schematic diagram of another embodiment of a reversed image sensing apparatus according to the present invention.
Figure 4:
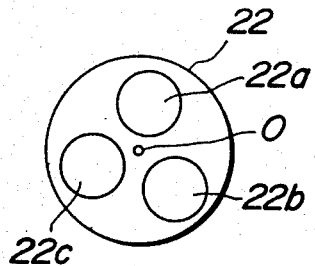
FIG. 4 is a plan view of a rotating filter plate used in the apparatus shown in FIG. 3.

FIG. 3 shows another embodiment of a reversed image sensing apparatus according to the invention. In the present embodiment, a positive color video signal is obtained from a negative color image recorded on a developed color negative film 21. The positive color video signal is converted into a color television signal of NTSC color television system so as to be displayed on a conventional color television monitor as a positive color image. In FIG. 3, elements corresponding to those shown in FIG. 1 are designated by the same reference numerals. In the present embodiment, between a color negative film 21 and an image sensor 5 is interposed a rotating filter plate 22 having three complementary color filters. The rotating filter plate 22 is driven by an electric motor 24 adapted to be controlled by a motor circuit 23 in synchronism with a synchronizing signal delivered from a synchronizing signal generator 6. The rotating filter plate 22 comprises three complementary color filters, that is a cyan filter 22a, a magenta filter 22b and a yellow filter 22c arranged on the same circle and equidistantly separated from each other as shown in FIG. 4. In a television signal processing circuit 18, a positive video signal of each complementary color component supplied from a voltage inverting circuit 11 is converted into an NTSC color television signal and then displayed on a conventional color television monitor 19. A cyan signal, a magenta signal and a yellow signal are supplied to a red electron gun, a green electron gun and a blue electron gun, respectively. In the present embodiment, if a monochromatic negative film is replaced for the color negative film 21, it is possible to display a positive monochromatic image on the color television monitor 19.

In the present embodiment, a light emitted from a white light source 2 passes through the color negative film 21 and rotating filter plate 22 and incidents on the photosensitive element 16. An output signal from the photosensitive element 16 is used to compensate for a variation in intensity of the white light source 2 in the output video signal of the voltage inverting circuit 11.

As stated hereinbefore, the reversed image sensing apparatus according to the invention is capable of displaying, on the television monitor, a negative image recorded on a negative film as a positive image without printing it and hence is significantly economical. Moreover, in the apparatus according to the invention, the negative image recorded on the negative film is formed on the image sensor composed of a charge coupled device (CCD) or the like from which the video signal to be inverted is delivered, so that the apparatus is simple in construction and small in size. In addition, the output video signal from the voltage inverting circuit 11 is converted into an NTST television signal, so that it is possible to display the video signal on the conventional color or black and white television monitor. Furthermore, the apparatus according to the present invnetion is capable of displaying the negative image formed on the engative film as an enlarged positive image and hence is very convenient. In addition, an intensity of a white light source is detected by a photosensitive element so as to correct a level of a reversed video signal against a variation in said intensity so that a reversed positive image is always obtained with desired luminance level.

The invention is not limited to the above described embodiments, but various changes and modifications may be made. In above described embodiments, a reversed positive image is produced from a negative image recorded on a negative film. Conversely, a reversed negative image may be displayed on a television monitor from a positive image. Alternatively, a light reflected from a recording medium such as a film or the like may be formed on an image sensor so as to obtain a reversed video signal of the image formed on the record medium. In the case of displaying a reversed video signal on a color television monitor exclusively used for it, the reversed video signal may be processed correspondingly to obtain a given monitor signal. In the above described embodiments, the brightness signal delivered from the photosensitive element 16 is used to control the reference voltage of the differential amplifier 12 so as to correct the level of the video signal in response to change of the white light source 2. Such compensation for variation in intensity of the white light source may be realized at a preceding or subsequent stage of a voltage inverting circuit 11. Instead of changing the level of the video signal or in addition thereto, a gain of the video signal may be corrected. The photosensitive element 16 for detecting an intensity of the white light source 2 may be installed at any position where a light emitted from the source 2 can be received. Moreover, in the embodiment shown in FIG. 3, the tri-color stripe filter may be arranged in front of the image sensor 5 and the image sensor may be line-scanned so as to obtain a video signal of each color component. Finally, use may be made of a combination of two semi-transparent mirrors and two different color filters or two dichroic mirrors which can transmit light having different colors for the purpose of forming light flux passed through the negative film on three image sensors as images of different color components and scanning these image sensors. Thus, it is possible to simultaneously obtain a video singal of each color component.

What is claimed is:

1. In a reversed image sensing apparatus comprising a light source for illuminating a record medium having recorded thereon picture images to be sensed, an image sensor formed of at least one array of charge coupled devices and a driving circuit for driving the array of charge coupled devices in accordance with clock pulses and synchronizing signals to derive a discrete pulse-like signal, a video signal generating circuit for converting the discrete pulse-like signal into a continuous video signal having an appropriate level and a differential amplifier having a first input for receiving the video signal and a second input for receiving a reference voltage generated by a reference voltage generator to produce an inverted video signal with respect to a reference level defined by said reference voltage, the improvement comprising: providing said reference voltage with a photosensitive element for receiving light emitted from said light source to produce a correction signal corresponding to the intensity variation of said light, and a controlling circuit for automatically adjusting the reference voltage in accordance with the correction signal.

2. An apparatus according to claim 1, wherein: said record film is of a black and white film and said photosensitive element is arranged to directly receive the light emitted from the light source.

3. An apparatus according to claim 1, wherein: said record film is of a color film, a color separation filter means inserted between the film and the image sensor, and said photosensitive element is arranged between the color separation filter means and the image sensor.

4. An apparatus according to claim 1, wherein: said reference voltage generator further comprises a potentiometer having a movable arm connected to said second input of the differential amplifier and said correction signal from the photosensitive element is also applied to the second input of the differential amplifier.

5. An apparatus according to claim 1, wherein: said differential amplifier is provided with a feedback loop for controlling a gain of the inverted video signal.

6. An apparatus according to claim 1, further comprising: a sensitivity compensating filter interposed between the light source and the photosensitive element.

* * * * *